United States Patent [19]

Jeong

[11] Patent Number: 5,246,781

[45] Date of Patent: Sep. 21, 1993

[54] PIGMENT COATED PHOSPHOR AND METHOD FOR MANUFACTURING SAME

[75] Inventor: Jwa-yeong Jeong, Seoul, Rep. of Korea

[73] Assignee: Samsung Electron Devices Co., Ltd., Kyunggi-do, Rep. of Korea

[21] Appl. No.: 933,657

[22] Filed: Aug. 24, 1992

[30] Foreign Application Priority Data

Oct. 17, 1991 [KR] Rep. of Korea ............... 91-18310

[51] Int. Cl.$^5$ ............................................. C09K 11/02
[52] U.S. Cl. ............................. 428/407; 252/301.36; 427/64; 427/68; 427/218; 427/220; 428/475.5; 428/690; 428/691
[58] Field of Search ............... 252/301.36; 427/64, 427/68, 218, 220; 428/407, 475.5, 690, 691

[56] References Cited

U.S. PATENT DOCUMENTS 3,011,904 12/1961 Ballentine et al. ............... 428/407
3,156,665 11/1964 Brossman et al. ............... 428/407
3,300,310 1/1967 Kennard et al. ............... 252/301.36
5,002,827 3/1991 Shimada et al. ............... 428/407

*Primary Examiner*—Jack Cooper
*Attorney, Agent, or Firm*—Leydig, Voit & Mayer

[57] ABSTRACT

A method of preparing a pigment-coated phosphor is provided which comprises the steps of:

(a) preparing a pigment dispersion by adding pigment particles in an amount of 0.05 to 10% by weight, based on the amount of phosphor, to one of (i) a solution comprising adipic acid in the range of 0.05 to 2% by weight, based on the amount f phosphor, or (ii) a solution comprising 1,6-hexanediamine in the range of 0.05 to 2%, based on the amount of phosphor, and (b) mixing the pigment dispersion with the other of the solutions not used to form the pigment dispersion and with a phosphor dispersion comprising a phosphor dispersed in distilled water to form a pigment-coated phosphor. A pigment coated phosphor prepared according to this method is also provided.

18 Claims, No Drawings

PIGMENT COATED PHOSPHOR AND METHOD FOR MANUFACTURING SAME

BACKGROUND OF THE INVENTION

The present invention relates to a pigment coated phosphor used in manufacturing the phosphor layer of a high contrast cathode ray tube for consumer use and to a method for manufacturing the same, and particularly to a pigment coated phosphor in which the dispersibility is good and flocculation between phosphor particles is largely prevented Generally, adhesion of red, green and blue pigment particles on the surface of respective red, green and blue emitting phosphors employed when manufacturing a phosphor layer of a cathode ray tube, enhances color purity of the emitted light from the phosphor by a so-called filter effect, absorbing or reducing light of an undesired wavelength and largely enhancing the contrast of the reproduced image by absorbing the external light reflected on the panel surface.

These kinds of pigment coated phosphors are generally manufactured by coating pigment particles on the surface of phosphor particles through preparing phosphor dispersion and pigment dispersion, mixing them with a binder and then hardening the binder using a hardening agent.

Many methods for manufacturing such pigment coated phosphors are well known. For example, in Japanese Laid-open Patent sho 50-56146 and 51-80296, methods for manufacturing pigment coated phosphors employing gum arabic and gelatin as binders are disclosed. Also in U.S. Pat. No. 4,049,842, a method for manufacturing a pigmented phosphor using acryl emulsion is disclosed.

The pigment coated phosphor manufactured by the above-mentioned methods should satisfy the following conditions so as to provide a phosphor having good characteristics.

First, pigment particles should adhere to the surface of the phosphor with sufficient strength so that the pigment particles may not detach from the bare phosphor during the slurry combining process; second, the pigment particles should be uniformly distributed on the surface of the phosphor during the pigment coating process and the pigment coated phosphors should not flocculate each other; third, the employed binders should be cleared through evaporation during a baking process when manufacturing the cathode ray tube and; fourth, an adequate amount of pigment particles should be coated on the surface of the phosphor, considering the luminance deterioration and reflection ratio of the phosphor, etc.

According to the conventional method, the above-required various conditions are almost satisfied for the common cathode ray tube. However, cathode ray tubes of high contrast and high definition, following the trend of recent times, require far more reduction of luminance deterioration, restraint of flocculation and consistent adhesion of the pigments.

When using an acryl emulsion as a binder, high flocculation between phosphor particles occurs and this gives an undesirable phosphor having defective characteristics and results in a mesh-plugging phenomenon. When using gelatin/gum arabic as the binder, though the ratio of flocculation occurrence is lower than that occurring when employing acryl emulsion, the adhesion power of the pigment particles to the surface of the phosphor is too weak. Moreover, when employing gelatin, since the change of the quality of the gelatin results in the pigment's detachment from the phosphor, another method for manufacturing a pigment coated phosphor employing an agent which can inhibit the decomposition of gelatin is disclosed (Japanese Patent Publication No. sho 61-1478).

SUMMARY OF THE INVENTION

An object of the invention is to provide a method for manufacturing a pigment coated phosphor, whose manufacturing process is shortened and whose manufacturing cost is largely reduced, by employing a novel binder.

Another object of the invention is to provide a pigment coated phosphor in which the adhesion power between pigment particles and phosphor particles is strong and the distribution of particle size is good.

To accomplish the above objects of the present invention, there is provided a method for manufacturing a pigment coated phosphor comprising the steps of: manufacturing an adipic acid solution containing 0.05 to 2 weight percent of adipic acid based on the amount of phosphor and manufacturing an 1,6-hexanediamine solution containing 0.05 to 2 weight percent of 1,6-hexanediamine based on the amount of phosphor; adding 0.05 to 10 weight percent of pigment particles based on the amount of phosphor to one of the thus-obtained solutions to prepare a pigment dispersion; and mixing the pigment dispersion, the other solution and a phosphor dispersion obtained by dispersing 100 weight percent of phosphor into distilled water and then stirring them.

In manufacturing the adipic acid solution and 1,6-hexanediamine solution, besides distilled water, methanol, ethanol and acetone can be used.

To accomplish another object of the present invention, there is provided a pigment coated phosphor comprising red, green or blue phosphors and pigment adhered on the surface of the phosphor through a binder, wherein the binder is nylon 6,6 synthesized by polymerization of 0.05 to 2 weight percent of adipic acid and 1,6-hexanediamine, respectively, based on the amount of the phosphor.

Especially, the amount of the adipic acid and 1,6-hexanediamine added ranges preferably from 0.1 to 1 weight percent based on the amount of the phosphor.

For the phosphor, a red emitting $Y_2O_2S:Eu$ phosphor, a green emitting $ZnS:Cu,Al$ or $ZnS:Cu,Au,Al$ phosphor, and a blue emitting $ZnS:Ag,Cl$ or $ZnS:Ag,Al$ phosphor are preferable.

DETAILED DESCRIPTION OF THE INVENTION

The pigment coated phosphor of the present invention is obtained by utilizing the principal that a nylon-based polymer is produced through the condensation polymerization reaction of acid and amine. In the present invention, after adhering the acid or amine compound to the surface of the pigment, phosphor and the remaining amine or acid are added to the pigment-containing mixture and mixed to produce a nylon-based polymer through a condensation reaction of the acid and amine compound, and the produced nylon-based polymer simultaneously adheres the pigment particles onto the surface of the phosphor.

The present invention utilizing the above-mentioned principal will be described with adipic acid and 1,6-hexanediamine as an illustration.

Adhesion of the pigment particles to the phosphor particles is achieved through the formation of the polymerization compound of adipic acid (or 1,6-hexanediamine) on the surface of the pigment with 1,6-hexanediamine (or adipic acid) added afterward. The reaction equation is as follows.

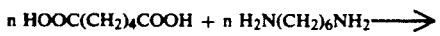

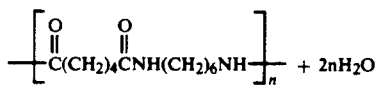

Almost all of the phosphors emitting red, green and blue color can be applied in the present invention. For example, as red emitting phosphors, europium activated yttrium oxide ($Y_2O_3$:Eu), europium activated yttrium oxysulfide ($Y_2O_2S$:Eu), europium activated yttrium vanadate ($YVO_4$:Eu), silver activated zinc cadmium sulfide ((Zn,Cd)S:Ag), manganese activated magnesium sulfide ($MgSiO_3$:Mn), manganese activated zinc orthophophate ($Zn_3(PO_4)_2$:Mn), etc. can be used. As green emitting phosphors, copper activated zinc sulfide (ZnS:Cu), manganese activated zinc silicate ($Zn_2SiO_4$:Mn), copper and aluminium activated zinc sulfide (ZnS:Cu,Al), copper, gold and aluminium activated zinc sulfide (ZnS:Cu,Au,Al), copper activated zinc cadmium sulfide ((Zn,Cd)S:Cu), zinc activated zinc oxide (ZnO:Zn), silver activated zinc cadmium sulfide ((Zn,Cd)S:Ag), silver activated zinc sulfosilinide (Zn(S,Se):Ag), etc. can be used. As blue emitting phosphors, silver activated zinc sulfide (ZnS:Ag), silver and aluminium activated zinc sulfide (ZnS:Ag,Al), silver and chlorine activated zinc sulfide (ZnS:Ag,Cl), calcium tungstate ($CaWO_4$), cerium activated calcium magnesium silicate ($2CaO.MgO.2SiO_2$:Ce), terbium activated yttrium oxysulfide ($Y_2O_2S$:Tb), titanium activated calcium magnesium silicate ((Ca,Mg)$SiO_2$:Ti), etc. can be used. The mean diameter of these phosphors preferably ranges from 3 to 15μm.

Various colored pigments as follows can be employed in the present invention. For example, red pigments as α-ferric oxide (α-$Fe_2O_3$), γ-ferric oxide (γ-$Fe_2O_3$), cadmium sulfoselenide (Cd($S_{1-x},Se_x$), $0<x<1$), cuprous oxide ($Cu_2O$), etc., green pigments as chrome oxide ($Cr_2O_3$), cobalt green (CoO.ZnO), etc. and blue pigments as ultramarine ($3NaAl.SiO_2.Na_2S_2$), Prussian blue [$Fe_4\{Fe(CN)_6\}_3.nH_2O$], cobalt blue (CoO.n$Al_2O_3$), cupric sulfide (CuS), etc. can be used. The amount of the pigment preferably ranges from 0.05 to 10 weight percent.

A method for manufacturing the pigment coated phosphor of the present invention is as follows.

First, pigment particles and adipic acid are mixed together and then pulverized for 1 or 2 days by means of a ball mill to obtain a pigment dispersion. Phosphor and distilled water are mixed at a weight ratio of 1:4 and stirred until the mixture becomes homogeneous by means of a stirrer to obtain a phosphor dispersion After mixing the thus obtained two dispersions, 1,6-hexanediamine dissolved in distilled water is added to the mixture and then stirred for the proper time. At this point, the pigment with 1,6-hexanediamine can be mixed to obtain a pigment dispersion, and afterward, adipic acid added.

To the thus-obtained mixture, a weak acid such as acetic acid, formic acid, etc. is preferably added dropwise to adjust the pH of the solution to 4 to 10, the more preferred pH range being 6 to 9. According to the present invention, the pH-adjusting process can be omitted because the pigment coated phosphor of the present invention without the pH-adjusting process is superior to that according to the conventional method.

An adequate amount of adipic acid and 1,6-added, hexanediamine which are employed as components of the binder, ranges from 0.05 to 2 weight percent based on the amount of phosphor. If the amount added is lower than 0.05 weight percent, the adhesion power of the pigment particles becomes low and, if higher than 2 weight percent, undesirable flocculation of the pigmented phosphor appears. The preferred amount ranges from 0.1 to 1 weight percent.

After the pH-adjusting process, if used, the common process steps such as washing, separation and drying of the pigment coated phosphor will give the pigment coated phosphor of the present invention.

Here, the drying temperature is commonly about 120° C., drying at this temperature gives a pigmented phosphor having sufficient characteristics. However, drying at 150° to 170° C. gives a pigmented phosphor having superior characteristics. The high drying temperature seems to enhance the polymerization degree of the binder components.

The preferred embodiments of the present invention will be described in detail below.

EXAMPLE 1

To 1.5g of cobalt blue, 0.2g of adipic acid (KANTO CHEMICAL CO., JAPAN) was added and then pulverized for 1 day by means of a ball mill to prepare a pigment dispersion. 100g of ZnS:Ag,Cl blue emitting phosphor was dispersed in 400g of distilled water and to this phosphor dispersion, the pigment dispersion was added and stirred. 0.2g of 1,6-hexanediamine (KISHIDA CHEMICAL CO., JAPAN) dissolved in 100g of distilled water was slowly added to the above mixture and then a 5% aqueous acetic acid solution was added to adjust the pH of the solution to 4. After twice washing, separating and drying the product, sieving by means of a 400 mesh sieve gives the pigment coated phosphor of the present invention. The phosphor characteristics of the obtained pigment coated phosphor is illustrated in Table 1.

EXAMPLE 2

A pigment coated phosphor of the present invention was obtained according to the same method as in Example 1, but without the pH-adjusting step. The pH was 10.14 and the obtained pigment coated phosphor was slightly smaller, but had almost the same diameter and distribution of particle size as the pigment coated phosphor of example 1.

EXAMPLE 3

A pigment coated phosphor of the present invention was obtained according to the same method as in Example 1, except that ZnS:Ag,Al phosphor was used instead of the ZnS:Ag,Cl phosphor.

EXAMPLE 4

The pigment coated phosphor of the present invention was obtained according to the same method as in Example 1, except that a surface-treated ZnS:Ag,Cl phosphor with silicon dioxide ($SiO_2$) through water glass ($K_2O \cdot nSiO_2$) was employed instead of the ZnS:Ag,Cl phosphor.

EXAMPLE 5

To 0.16g of $\alpha$-Fe2O3, 0.1 g of adipic acid (KANTO CHEMICAL CO., JAPAN) was added and then pulverized for 1 day by means of a ball mill to prepare a pigment dispersion. 100g of $Y_2O_2S$:Eu red emitting phosphor was dispersed in 400g of distilled water and to this phosphor dispersion, the pigment dispersion was added and stirred. A solution of 0.1 g of 1,6-hexanediamine (KISHIDA CHEMICAL CO., JAPAN) dissolved in 150g of distilled water was slowly added to the above mixture and then 5% aqueous acetic acid solution was added to adjust the pH of the solution to 8. After twice washing, separating and drying the product, sieving by means of a 400 mesh sieve gave the pigment coated phosphor of the present invention.

COMPARATIVE EXAMPLE 0.4g of gelatin was dissolved in 200g of distilled water to give an aqueous gelatin solution. To this solution, 100g of ZnS:Ag,Cl phosphor the same distribution of particle size as that in Example 1 was added to prepare a phosphor dispersion.

0.4g of gum arabic was dissolved in 150g of distilled water to give an aqueous gum arabic solution. To this solution, 1.5g of cobalt blue was added and then stirred to prepare a pigment dispersion.

After mixing the phosphor dispersion and pigment dispersion, the pH of the mixture was adjusted to 4. The mixture was cooled to 5° C and the binder hardened by slowly adding 1 g of formaldehyde.

Subsequent washing, separating, drying and sieving gave the conventional pigment coated phosphor.

The phosphor characteristics of the pigment coated phosphors according to Example 1 and Comparative Example are shown in Table 1.

<TABLE 1>

| | median diameter ($\mu m$) | mean diameter ($\mu m$) | filtering time (sec.) | pigment-attaching state |
|---|---|---|---|---|
| before pigment coating | 9.30 | 9.35 | — | — |
| Example 1 | 9.54 | 9.59 | 35 | A |
| Com. Example | 9.85 | 9.78 | 40 | B |

In Table 1, each diameter was measured through ELZON 180XY. The filtering time is the time required for 250 ml of phosphor slurry containing each pigmented phosphor to pass through a 400 mesh sieve.

From Table 1, it is shown that though manufacturing the pigment coated phosphors with the same bare phosphor having the same diameter, the diameter of the pigment coated phosphor according to the present invention is smaller than that of the pigmented phosphor according to the conventional method, and the filtering time of the pigmented phosphor of the present invention is shorter than that of the pigmented phosphor according to the conventional method. This means that the degree of flocculation between the pigment coated phosphor of the present invention is far less than that between the pigmented phosphor according to the conventional method.

The pigment-attaching state is graded as the result of human observation of the supernatant water after dispersing each pigment coated phosphor in distilled water and setting. The pigmented phosphor and bare phosphor are heavier than the pigment particles detached from the pigmented phosphor and, therefore, settle faster than the free pigment particles. The grades A and B are arbitrary and endowed by the inventor. Anyhow, this result means that the adhesion power of the pigment particles to the bare phosphors in the pigmented phosphor of the present invention is stronger than that of the pigmented phosphor according to the conventional method. This further means that when applying the pigment coated phosphor of the present invention to a cathode ray tube, a reproduced image having high contrast and high color purity is obtainable.

The present inventor attempted to manufacture a pigment coated phosphor using nylon 6,6 as a binder, however, in this case, a large degree of flocculation between the pigmented phosphor particles appeared and made it difficult to apply to a cathode ray tube.

The pigment coated phosphor of the present invention has no problem of pigment detachment that usually occurs when manufacturing a pigment coated phosphor using gelatin, which is caused by the change of gelatin quality. Moreover, since the pH-adjusting step after adding the binder can be omitted and no cooling and hardening agent addition process is required in the method of the present invention, the manufacturing process can be largely reduced. This enhances efficiency and reduces manufacturing costs.

While the pigment coated phosphor of the present invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of manufacturing a pigment-coated phosphor comprising the steps of:
    (a) preparing a pigment dispersion by adding pigment particles in an amount of 0.05 to 10% by weight, based on the amount of phosphor, to one of
        (i) a solution comprising adipic acid in the range of 0.05 to 2% by weight, based on the amount of phosphor, or
        (ii) a solution comprising 1,6-hexanediamine in the range of 0.05 to 2%, based on the amount of phosphor, and
    (b) mixing said pigment dispersion with the other of the solutions not used to form the pigment dispersion and with a phosphor dispersion comprising a phosphor dispersed in distilled water to form a pigment-coated phosphor.

2. A method for manufacturing a pigment-coated phosphor as claimed in claim 1 wherein the amount of said adipic acid and 1,6-hexanediamine, respectively and independently, are in the range from 0.1 to 1 weight percent, based on the amount of said phosphor.

3. A method for manufacturing a pigment-coated phosphor as claimed in claim 1, wherein each of the adipic acid solution and 1,6-hexadiamine solution independently includes at least one solvent selected from the group consisting of distilled water, methanol, ethanol and acetone.

4. A method for manufacturing a pigment coated phosphor according to claim 1 wherein the pigment coated phosphor formed is further washed, separated and dried at a temperature of 150°-170° C.

5. A method for manufacturing a pigment coated phosphor according to claim 1 wherein one of said adipic acid or 1,6-hexanediamine is adhered to pigment particles in said pigment dispersion.

6. A method for manufacturing a pigment coated phosphor according to claim 1 wherein the pH of the mixture of pigment dispersion, phosphor dispersion and other solution is adjusted to a value in the range of 4 to 10.

7. A method for manufacturing a pigment coated phosphor according to claim 6 wherein said pH is a value in the range of 6 to 9.

8. A pigment coated phosphor comprising red, green or blue emitting phosphor and pigment adhered to the surface of said phosphor through a binder, wherein said pigment coated phosphor is obtained by adhering pigment particles to the surface of said phosphor particles through a nylon 6,6 binder prepared by the process comprising the steps of:
   (a) preparing a pigment dispersion by adding pigment particles in an amount of 0.05 to 10% by weight, based on the amount of phosphor, to one of
      (i) a solution comprising adipic acid in the range of 0.05 to 2% by weight, based on the amount of phosphor, or
      (ii) a solution comprising 1,6-hexanediamine in the range of 0.05 to 2%, based on the amount of phosphor, and
   (b) mixing said pigment dispersion with the other of the solutions not used to form the pigment and with a phosphor dispersion comprising a phosphor dispersed in distilled water to form a pigment-coated phosphor.

9. A pigment-coated phosphor as claimed in claim 8 wherein the amount of said adipic acid and 1,6-hexanediamine, respectively and independently, are in the range from 0.1 to 1 weight percent, based on the amount of said phosphor.

10. A pigment-coated phosphor as claimed in claim 8 wherein the amount of said adipic acid and 1,6-hexanediamine solution independently includes at least one solvent selected from the group consisting of distilled water, methanol, ethanol and acetone.

11. A pigment coated phosphor according to claim 8, wherein the pigment coated phosphor formed is further washed, separated and dried at a temperature of 150°-170° C.

12. A pigment coated phosphor according to claim 8 wherein the pH of the mixture of pigment dispersion, phosphor dispersion and other solution is adjusted to a value in the range of 4 to 10.

13. A pigment coated phosphor according to claim 10 wherein said pH is a value in the range of 6 to 9.

14. A pigment coated phosphor as claimed in claim 8, wherein said red emitting phosphor is $Y_2O_2S:Eu$ phosphor.

15. A pigment coated phosphor as claimed in claim 8 wherein said green emitting phosphor is one of $ZnS:Cu,Al$ and $ZnS:Cu,Au,Al$ phosphor.

16. A pigment coated phosphor as claimed in claim 8 wherein said blue emitting phosphor is one of $ZnS:Ag,Cl$ and $ZnS:Ag,Al$ phosphor.

17. A method of preparing a pigment-coated phosphor comprising the steps of:
   (a) preparing a pigment dispersion by mixing pigment particles in an amount of 0.05 to 10% by weight, based on the amount of phosphor, with a solution comprising adipic acid in the range of 0.05 to 2% by weight, based on the amount of phosphor,
   (b) mixing said pigment dispersion with a phosphor dispersion obtained by dispersing the phosphor in distilled water to form a pigment-phosphor mixture; and
   (c) mixing said pigment-phosphor mixture with a solution comprising 1,6-hexanediamine in the range of 0.05 to 2%, based on the amount of phosphor to form a pigment-coated phosphor.

18. A method for manufacturing a pigment coated phosphor as claimed in claim 17 wherein the pH of said pigment-phosphor mixture and said 1,6-hexanediamine is adjusted to a value in the range of 4 to 10.

* * * * *

UNITED STATES PATENT AND TRADEMARK OFFICE
CERTIFICATE OF CORRECTION

PATENT NO. : 5,246,781
DATED : September 21, 1993
INVENTOR(S) : Jwa-yeong Jeong

It is certified that error appears in the above-indentified patent and that said Letters Patent is hereby corrected as shown below:

TITLE PAGE
In item no. 57, Abstract, line 7, change "f" to --of--.

Claim 10, column 8, line 2, after "wherein" insert --each of--.

Claim 10, column 8, line 2, delete "amount of said";

Claim 10, column 8, line 2, after "acid" insert --solution--.

Claim 11, column 8, line 1, delete ",".

Signed and Sealed this

Nineteenth Day of April, 1994

Attest:

BRUCE LEHMAN

*Attesting Officer*   *Commissioner of Patents and Trademarks*